No. 665,958. Patented Jan. 15, 1901.
S. H. DUGAN.
DOOR SILL PAN.
(Application filed June 12, 1900.)
(No Model.)
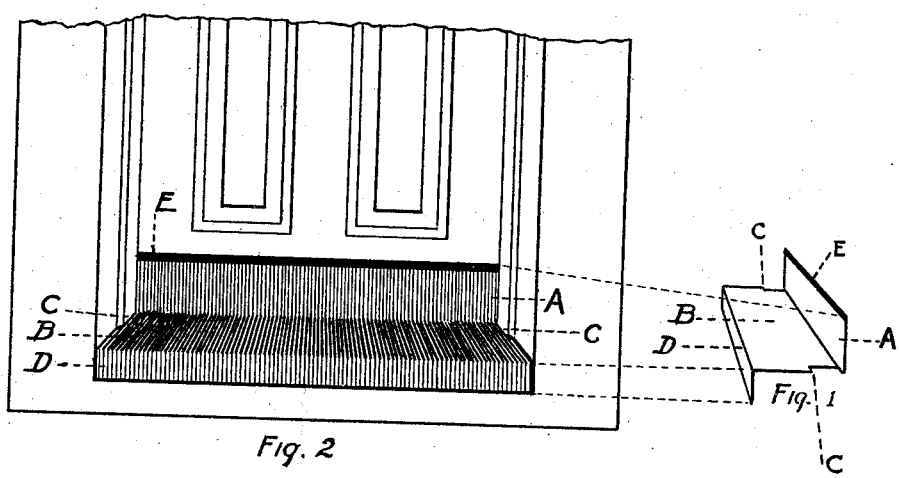
WITNESSES
John H. Bergen
Rose F. Gruber.
INVENTOR
Sarah Hicks Dugan

UNITED STATES PATENT OFFICE.

SARAH HICKS DUGAN, OF DENVER, COLORADO.

DOOR-SILL PAN.

SPECIFICATION forming part of Letters Patent No. 665,958, dated January 15, 1901.

Application filed June 12, 1900. Serial No. 20,102. (No model.)

*To all whom it may concern:*

Be it known that I, SARAH HICKS DUGAN, a citizen of the United States of America, residing at Denver, in the county of Arapahoe and State of Colorado, have invented a certain new and useful Improvement in Door-Sill Pans; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is a detachable "self-setting" door-sill pan adapted to use on doors of resident houses, where worn sills are common.

My invention is a door-sill pan; and the objects of my invention are, first, to protect carpets, floors, and furniture from dust, snow, and dampness; second, to protect rooms and hallways from wind and cold, and, third, to protect the lower part of the door and the door-sill from rain, ice, and snow. I attain these objects by the mechanism illustrated and described in the accompanying drawings and specification, in which—

Figure 1 represents my door-sill pan entire. Fig. 2 represents my door-sill pan in use.

Similar letters of reference refer to similar parts throughout both views.

Referring to Fig. 1, A designates the upright of my door-sill pan, which forms the covering for the open space that commonly occurs between the door when closed and the sill, so as to prevent dust, rain, snow, wind, and cold from entering buildings, thus protecting carpets, floors, and furniture from dust, rain, snow, and dampness. Snow and rain blown into rooms and hallways are a menace to the health and happiness of housewives. The upright A is bound with felt or rubber, so as to prevent scratching of doors.

B designates the receptacle of my door-sill pan, which forms covering for sill, so as to protect it from dust, rain, snow, and ice. Another use of sill-cover B is to concur with upright A in covering the open space between sill and door when closed. Sill-cover B serves to cover open space caused by sills being much worn.

C C designate like notches in ends of door-sill pan, which are shaped so as to fit closely around the door-molding, so as to hold the door-sill pan firmly in place, thus making my door-sill pan self-setting.

The size of door-sill pan which I represent by Fig. 1 is thirty inches in length, with a four-inch upright, a six-inch sill, and a two-inch curve down. This is the size for common doors of resident houses. Other sizes can be easily made. The size of a door-sill pan is always governed by the width of the door to which the pan is to be attached.

I preferably use sheet-tin to make my door-sill pans of, because it is cheaper and easier to work, although almost any material would answer the purpose.

D designates the curve down. Its only use is to concur with sill-cover B in protecting the edge of the door-sill.

E designates the felt or rubber binding which protects the door from scratches.

To attach door-sill pan for use, take hold of upright A, elevate one end of pan until the notches C C are in place, and then press the pan down until it rests on door-sill, as shown in Fig. 2.

To remove door-sill pan, take hold of upright A and lift up on pan, taking care to elevate one end of pan, so as to allow notches C C to clear the molding.

Having described my invention, what I claim as new, and desire to secure by Letters Patent, is—

A door-sill pan, made of one piece of sheet-tin, curved and notched so as to fit closely to door-molding, thus forming entire cover for sill, with an upright bound with felt or rubber as specified.

In testimony whereof I affix my signature in presence of two witnesses.

SARAH HICKS DUGAN.

Witnesses:
GUS SWANSON,
J. H. BERGEN.